US010944653B2

(12) United States Patent
Walsh (10) Patent No.: US 10,944,653 B2
(45) Date of Patent: Mar. 9, 2021

(54) DIGITAL VISUALIZATION SYSTEMS AND METHODS

(71) Applicant: T-Mobile USA, Inc., Bellevue, WA (US)

(72) Inventor: Daniel Martin Walsh, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 153 days.

(21) Appl. No.: 15/616,008

(22) Filed: Jun. 7, 2017

(65) Prior Publication Data
US 2018/0227198 A1 Aug. 9, 2018

Related U.S. Application Data

(60) Provisional application No. 62/455,146, filed on Feb. 6, 2017.

(51) Int. Cl.
*H04L 12/26* (2006.01)
*G06Q 30/02* (2012.01)
(52) U.S. Cl.
CPC ........... *H04L 43/045* (2013.01); *G06Q 30/02* (2013.01)
(58) Field of Classification Search
None
See application file for complete search history.

(56) References Cited

U.S. PATENT DOCUMENTS

| 9,560,214 | B1* | 1/2017 | Phillip | H04M 15/705 |
| 2007/0004394 | A1* | 1/2007 | Chu | H04W 24/00 |
| | | | | 455/422.1 |
| 2009/0287961 | A1* | 11/2009 | Austin | G06F 11/26 |
| | | | | 714/37 |
| 2011/0130135 | A1* | 6/2011 | Trigui | H04W 24/08 |
| | | | | 455/423 |
| 2011/0151864 | A1* | 6/2011 | Byun | H04W 36/30 |
| | | | | 455/426.1 |
| 2013/0122882 | A1* | 5/2013 | Patel | H04L 41/0886 |
| | | | | 455/418 |
| 2016/0292659 | A1* | 10/2016 | Noonan | G07G 1/14 |

* cited by examiner

*Primary Examiner* — James A Edwards
(74) *Attorney, Agent, or Firm* — Lee & Hayes, P.C.

(57) ABSTRACT

The systems, devices, and techniques described herein are directed to providing digital visualizations in a telecommunications environment. A centralized server may store information associated with services and equipment available to operate on the telecommunication network. The centralized server may manage and update information provided to electronic devices to facilitate education and interaction between associates and users regarding services and equipment offers. Presentations to users may include static, dynamic, and interactive content. Network usage information such as signal strength and speed may be obtain from user electronic devices and aggregated to generate network coverage information over time and based on a location. Digital visualizations facilitate education and interaction at retail outlets to reduce message fragmentation and to increase engagement with users.

18 Claims, 9 Drawing Sheets

DIGITAL VISUALIZATION SYSTEMS AND METHODS

CROSS REFERENCE TO RELATED APPLICATION

This patent application claims priority filing benefit from U.S. Provisional Patent Application No. 62/455,146, filed Feb. 6, 2017, which is hereby incorporated by reference, in its entirety.

BACKGROUND

Modern telecommunication systems provide a rich mix of devices and services to individual customers and businesses. However, as a selection of available devices and services may be constantly changing, a sales associate may be unable to keep track of the devices and services available on the network, as well as understand a current state of the network. Further, there may be many separate channels to convey messages regarding changes to devices and services offered, which may result in fragmented messages or incomplete information provided to customers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein are directed to providing digital visualizations in a telecommunications context. The system may include a centralized server that generates and tracks offers and messages associated with equipment and services available for use in conjunction with a telecommunications network. Offers and messages may be developed at the centralized server and provided to individual electronic devices located at retail outlets or stores. As a store associate interacts with an individual electronic device, alerts and information can be provided to the associate to educate the associate with current offers, services, equipment, coverage etc. As the associate interacts with customers or users, the electronic devices may provide digital visualizations highlighting services and equipment, and may provide interactive content regarding network coverage at particular locations and/or over time. The electronic devices may further include functionality to receive information associated with a customer or user, and to generate customer information reports for further personalization of offers and messages, for example.

Further, the electronic device may present a user interface for presenting static and dynamic content to facilitate interaction and education between associates and users. For example, the electronic device may receive user input and may present various user interfaces in response to selections about a type of customer, selected services and/or equipment, customer information, etc. As an associate and/or a user navigates through the digital visualizations, the content provided for display may be updated on a daily basis, or as needed, to present current and/or relevant information. In some instances, the electronic device may receive user information (e.g., associated with a customer or user) and may personalize offers based on the customer information. For example, personalized content may be based in part on a user location, equipment type, selected services, user financial information, prior user behavior or information, etc.

Visualizations of network coverage may present data over time and/or may compare coverage at a particular location. For example, the centralized server may aggregate key performance indicators (KPIs) at various locations and over time, and may provide a variety of data for presentation via the electronic devices. For example, a network coverage visualization may compare coverage at a first location at a first time with coverage at the first location at a second time. In some instances, the visualizations may receive location data via the user interface and may present coverage information associated with the location. In some instances, coverage information may correspond to network data received from user equipment and aggregated to provide an indication of actual network coverage (e.g., "verified coverage"). In some instances, the visualizations may present previous coverage, projected coverage, or competitor coverage at a particular location. Thus, in some instances, the digital visualizations may present complex information at various levels to quickly compare and evaluate services, equipment, etc.

In this manner, the systems, devices, and techniques described herein improve a functioning of a computing device by providing an architecture that allows for centralized management of offers and messages for distribution to individual electronic devices. Such an architecture prevents fragmented or incomplete messaging, and allows complex visualizations of data to be quickly accessed for education and informational purposes. Further, the systems and techniques discussed herein are rooted in computer technology, such as telecommunication networks, and are provided to overcome problems in network visualization and message distribution, for example.

The systems, devices, and techniques described herein can be implemented in a number of ways. Example implementations are provided below with reference to the following figures.

Figure 1:
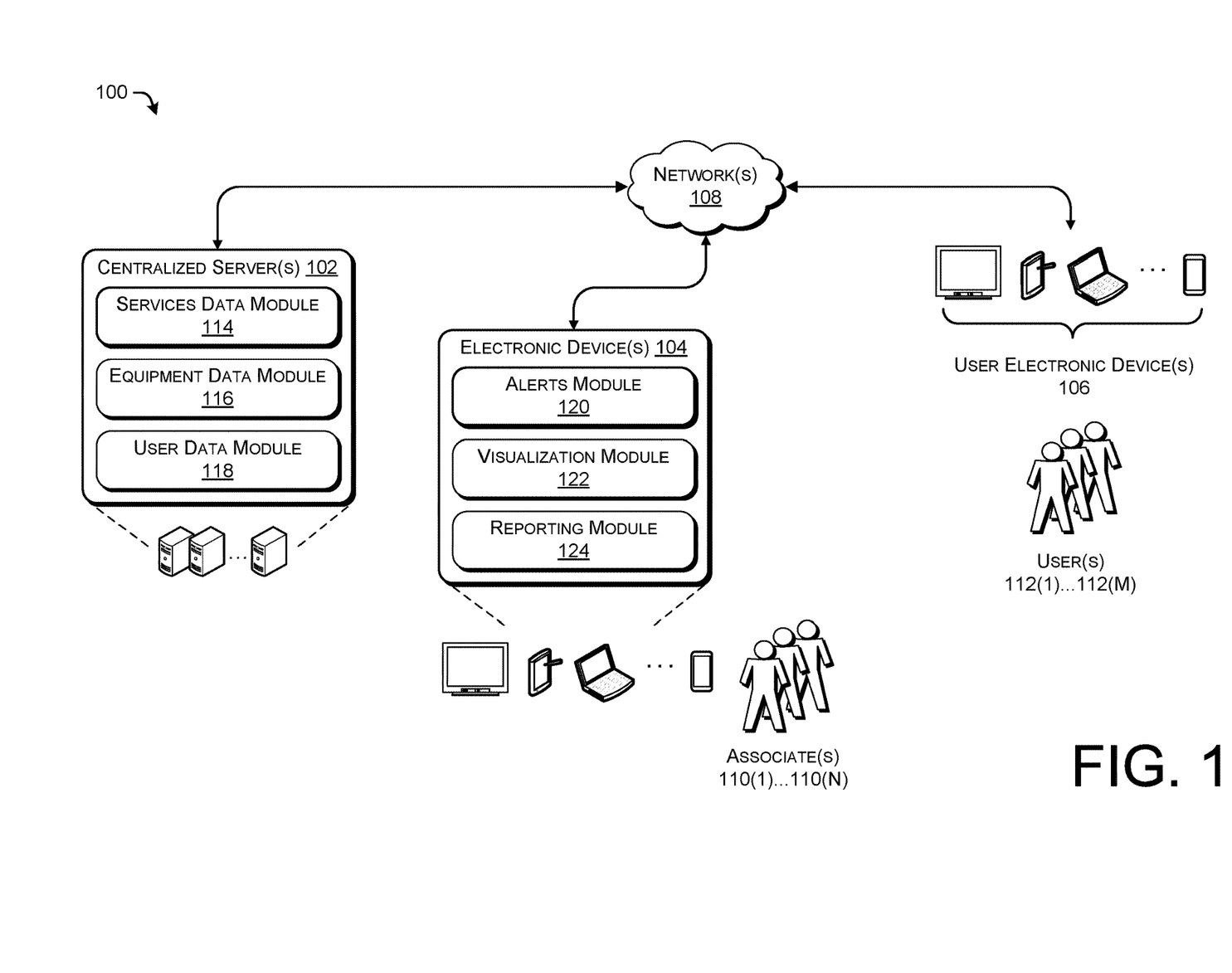
FIG. 1 illustrates an example environment for facilitating digital visualization systems and methods.

FIG. 1 illustrates an example environment 100 for facilitating digital visualizations in a telecommunications context.

In some instances, the environment 100 can include one or more centralized servers 102 in communication with one or more electronic devices 104 and/or one or more user electronic devices 106 via one or more networks 108 (e.g., the Internet). In some instances, the one or more electronic devices 104 (also referred to as an electronic device 104) may represent a smartphone or tablet computing device at a retail location or store associated with a network provider. Further, the one or more centralized servers 102 (also referred to as a centralized server 102) may represent a provider of network services, such as a mobile carrier. In some instances, the user electronic device 106 may represent an electronic device associated with an individual user or customer. As discussed herein, the centralized server 102 may develop content associated with devices and services and may provide the content to the electronic device 104. In some instances, the content provided to and presented by the electronic device 104 may be used to educate or inform one or more associates 110(1)-110(N), while in some instances, the content may be used to facilitate an interaction between the one or more associates 110(1)-110(N) and one or more users 112(1)-112(M).

The centralized server 102 may include one or more modules, such as a services data module 114, an equipment data module 116, and a user data module 118. The services data module 114 may include functionality to track, store, and/or update a database of information associated with services provided by a network provider associated with the centralized server 102. For example, services may include rate plans for a subscription service to provide mobile telecommunications services to one or more electronic devices. In some instances, the services data module 114 may store information associated with plans for individual customers, businesses, etc. In some instances, the services data module 114 may include information associated with a signal strength or quality at a particular location. Further, the services data module 114 may store information associated with deals, specials, or promotions, which may be associated with a particular period of time and/or may be based on a customer or user status (e.g., a new customer, an existing customer, based on a device subscription, based on user demographic information, user location, etc.). The services data module 114, as well as the equipment data module 116 (discussed below) may provide information to one or more electronic devices 104 on a distributed basis. In some instances, as updates are made to services provided by the telecommunications network (e.g., associated with the centralized server 102) the services data module 114 may push alerts or updates to the electronic devices 104.

The equipment data module 116 may store information associated with individual devices or equipment supported by the telecommunications network associated with the centralized server 102. For example, the equipment data module 116 may include a database of current inventory, expected inventory, etc., as well as actual, past, future etc., operation of the equipment at various locations. For example, the equipment data module 116 may receive usage data associated with a network and may aggregate the usage data associated with equipment operation on the telecommunications network. In some instances, the equipment data module 116 may include deals, promotions, specials, offers, etc., associated with equipment to operate on the telecommunication network associated with the centralized server 102. By way of example, and without limitation, examples of equipment may include various models of smartphones, smart wearable devices (e.g., a smartwatch), models of tablet devices, electronic book readers, etc. The offers associated with various equipment may be based on any number of factors, including but not limited to customer demographics, customer history, a number of devices associated with an account, usage information associated with a device or user, inventory, time of year, etc.

The user data module 118 may include functionality to receive user information and to ingest the user information into the database for tracking and follow up for service or device conversion. For example, when a user of the users 112 interacts with an associate of the associates 110, the user may provide user information associated with the user such as personal information, information associated with services or devices, notes provided by the associate, associate information, etc. In some instances, the user data module 118 may track any offers provided by the electronic device 104, and may follow up with the associate 110 and/or the user 112 to reengage the user 112 after an interaction at a retail store, for example. These and other aspects of the centralized server 102 are discussed throughout the disclosure.

In some instances, the centralized server 102 can provide alerts, messages, offers, promotions, etc. regarding services and equipment to one or more of the electronic devices 104. In some instances, the centralized server 102 may select a subset of the electronic devices 104 to update with information, based on location, time since last update, demographics associated with stores associated with the electronic devices 104, etc. In some instances, updates may be sent to all of the electronic devices 104.

The electronic device 104 may include one or more modules, such as an alerts module 120, a visualization module 122, and a reporting module 124. In general, the electronic device 104 may receive information from the centralized server, present alerts and visualizations to the associates 110 and/or to the users 112, receive user information, and may provide information to the centralized server 102 and/or the user electronic devices 106.

The alerts module 120 may include functionality to receive information from the centralized server 102, for example, regarding services and/or equipment offered or available for operation in connection with the telecommunications network associated with the centralized server 102. In some instances, the alerts module 120 may determine differences between previous messages and highlight the difference in an alert screen or by providing an indication at a time of login or authentication. Thus, the alerts module 120 can provide highly targeted and contextualized information to associates 110 so that the associates 110 can understand currently available devices and services available in connection with a telecommunications network.

The visualization module 122 can present static content, dynamic content, and/or interactive content via the electronic device 104. For example, the visualization module 122 may present any visual, audible, haptic, or combination thereof of content in connection with the electronic device 104. In some instances, the visualization module 122 may receive visualizations from the centralized server 102 for presentation as messages, offers, promotions, etc. for services and/or equipment. In some instances, the visualization module 122 may include functionality to receive inputs and to navigate within menus to relevant content based on user selections, user information, etc. In some instances, the visualization module 122 may receive user input and may generate reports to be provided via the reporting module 124.

The reporting module 124 may operate in conjunction with the visualization module 122 to provide reports of user interactions and/or user information to the centralized server 102 for aggregation and/or further analysis. In some instances, the reporting module 124 may provide personalized content to one or more user electronic devices 106 associated with the users 112, as discussed herein.

Additional aspects of the centralized server(s) 102 and the electronic devices 104 are discussed in connection with FIGS. 2-9, below.

Figure 2:
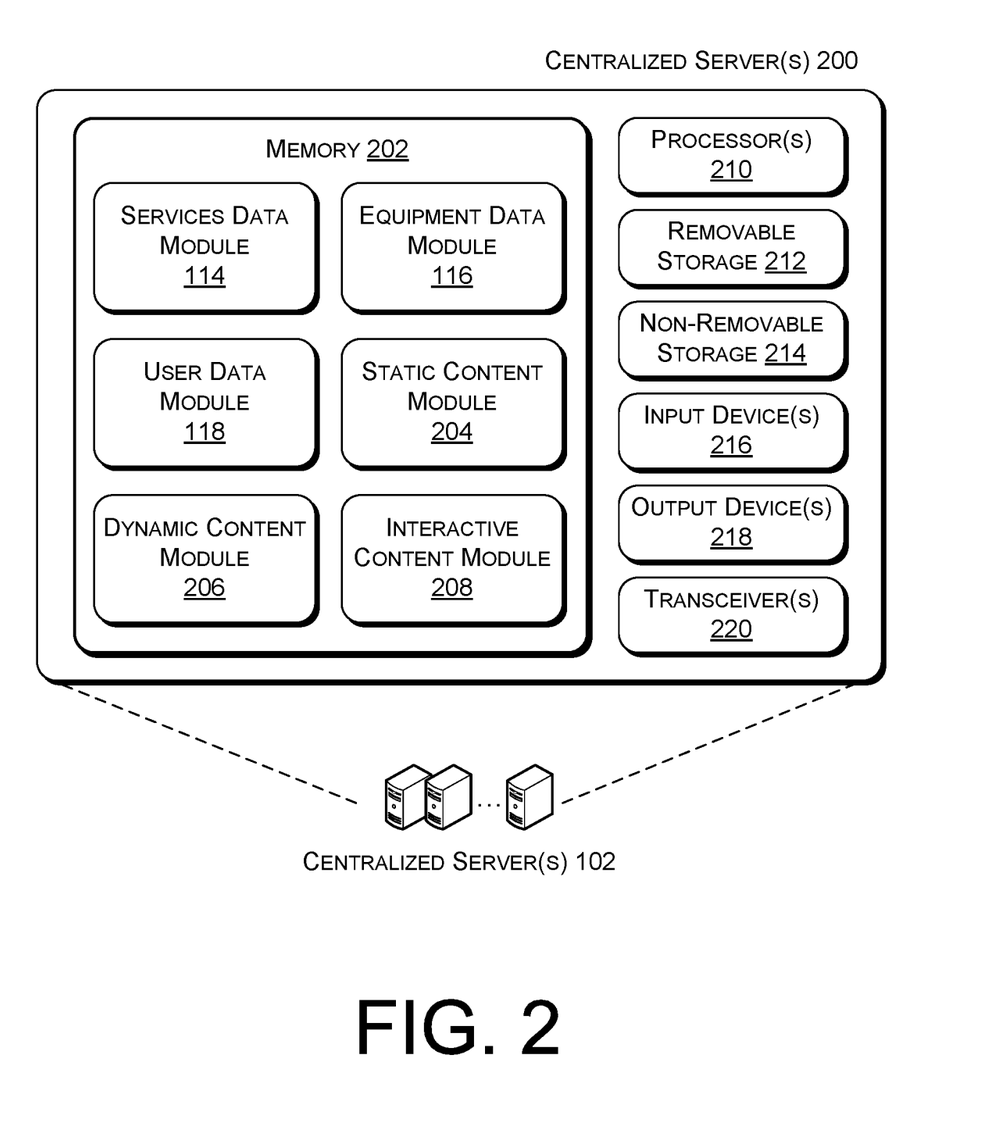
FIG. 2 illustrates an example centralized server configured to provide device information, services information, digital visualizations, and data collection in accordance with embodiments of the disclosure.

FIG. 2 illustrates an example centralized server 200 configured to provide digital visualizations, messages, and alerts to electronic devices, in accordance with embodiments of the disclosure. The centralized server 200 can correspond to the centralized server(s) 102 of FIG. 1, and may be used to implement the various operations described herein. It is to be understood in the context of this disclosure that the centralized server 200 can be implemented as a single device or as a plurality of devices with modules and data distributed among them. For example, the centralized server may include memory 202 storing the services data module 114, the equipment data module 116, the user data module 118, a static content module 204, a dynamic content module 206, and an interactive content module 208, as described herein. Also, the centralized server 200 includes processor(s) 210, a removable storage 212 and non-removable storage 214, input device(s) 216, output device(s) 218, and transceiver(s) 220.

In various embodiments, memory 202 is volatile (such as RAM), nonvolatile (such as ROM, flash memory, etc.) or some combination of the two. The services data module 114, the equipment data module 116, the user data module 118, the static content module 204, the dynamic content module 206, and the interactive content module 208 stored in the memory 202 can comprise methods, threads, processes, applications or any other sort of executable instructions. The services data module 114, the equipment data module 116, the user data module 118, the static content module 204, the dynamic content module 206, and the interactive content module 208 can also include files and databases.

Details of the services data module 114, the equipment data module 116, and the user data module 118 are provided above in the discussion of FIG. 1. In general, the services data module 114 may include functionality to generate offers, messages, deals, promotions, etc., in association with services offered by a network provider or telecommunications network associated with the centralized server 200. In general, the equipment data module 116 may include functionality to generate offers, message, deals, promotions, etc., in association with equipment offered by the network provider or telecommunication network. Further, the services data module 114 and the equipment data module 116 may include functionality to determine a network coverage at a location and/or to determine equipment effectiveness or compatibility with the telecommunications network. In general, the user data module 118 can include user information associated with current or prospective network users.

In some embodiments, the static content module 204 can include functionality to store and/or manage static content such as images, text, etc., for messages, offers, promotions, etc. In some instances, the static content module 204 can receive updates to the static content stored in the static content module 204, and may provide the updated content to the electronic devices 106, for example. In some instances, the static content module 204 may adapt the content to be presented on a variety of displays using any number of programs, browsers, operating systems, etc. By way of example, and without limitation, static content may be generated in accordance with Adobe Experience Manager software and content platform.

The dynamic content module 206 can include functionality to store and/or manage dynamic content, such as videos, animations, audio, etc., for messages, offers, promotions, etc. In some instances, the dynamic content module 206 can receive updates to the dynamic content stored in the dynamic content module 206 and may provide the updated content to the electronic devices 106 for presentation.

The interactive content module 208 may include functionality to store and/or manage interactive content for messages, offers, promotions, etc. In some instances, the interactive content may include programs, applets, modules, videos, audio, text, etc., that may respond or interact with a user and/or associate during or after presentation. For example, as discussed below, interactive content may include coverage maps that illustrate network coverage over time, or that illustrate network coverage at a particular location.

It may be understood that content to be provided by the centralized server 200 to one or more of the electronic devices 104 and/or the user electronic devices 106 may include static content, dynamic content, interactive content, or any combination thereof. Further, the centralized server 200 may include functionality to deploy, update, recall, etc. content to any and all devices, such as the electronic devices 104. In some instances, the static content, the dynamic content, and the interactive content may be provided to the electronic devices 104 as an application (e.g., an "app") and may be updated hourly, daily, weekly, on demand, or on any regular or irregular schedule.

In some instances, content may be developed using a variety of programming languages or techniques, including but not limited to: CSS (cascading-style sheet); HTML; HTML5; Javascript; GIF, etc. Further, content may be developed using any platform, such as Adobe Experience Manager (AEM), and may be compatible with any operating system (e.g., Android, iOS, Windows, Chrome OS, etc.).

In some embodiments, the one or more processor(s) 210 are central processing units (CPUs), graphics processing units (GPUs), or both CPU and GPU, or other processing units or components known in the art.

The centralized server 200 also includes additional data storage devices (removable and/or non-removable) such as, for example, magnetic disks, optical disks, or tape. Such additional storage is illustrated in FIG. 2 by removable storage 212 and non-removable storage 214. Tangible computer-readable media can include volatile and nonvolatile, removable and non-removable media implemented in any method or technology for storage of information, such as computer readable instructions, data structures, program modules, or other data. Memory 202, removable storage 212 and non-removable storage 214 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the centralized server 200. Any such tangible computer-readable media can be part of the centralized server 200.

The centralized server 200 also can include input device(s) 216, such as a keypad, a cursor control, a touch-sensitive display, voice input device, etc., and output device(s) 218 such as a display, speakers, printers, haptic feedback, etc. These devices are well known in the art and need not be discussed at length here.

As illustrated in FIG. 2, the centralized server 200 also includes one or more wired or wireless transceiver(s) 220. For example, the transceiver(s) 220 can include a network interface card (NIC), a network adapter, a LAN adapter, or a physical, virtual, or logical address to connect to the network(s) 108, or the electronic devices 104 or the user electronic devices 106, for example. To increase throughput when exchanging wireless data, the transceivers 220 can utilize multiple-input/multiple-output (MIMO) technology. The transceiver(s) 220 can comprise any sort of wireless transceivers capable of engaging in wireless, radio frequency (RF) communication. The transceivers 220 can also include other wireless modems, such as a modem for engaging in Wi-Fi, WiMax, Bluetooth, or infrared communication.

Figure 3:
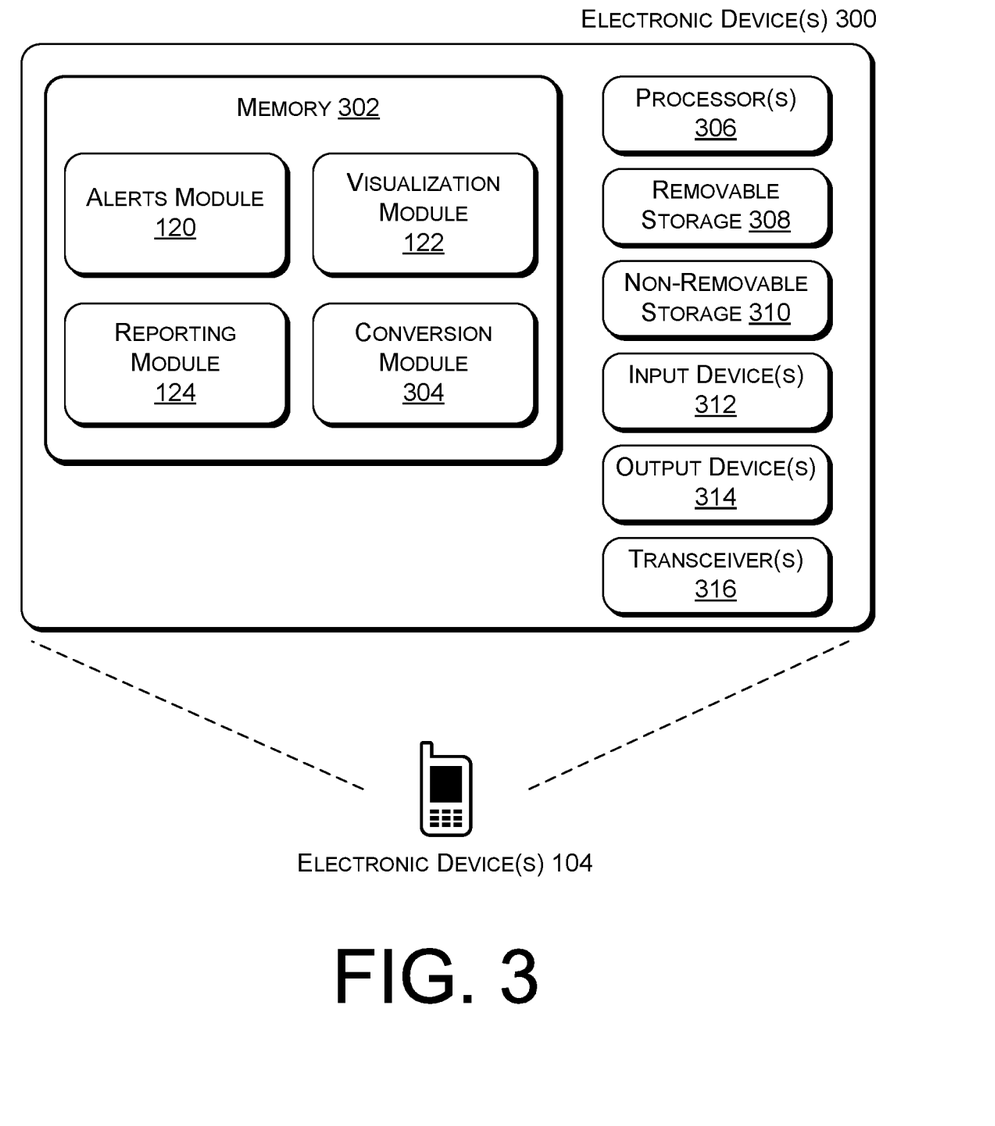
FIG. 3 illustrates an example user equipment configured to provide digital visualizations and to collect information for providing network services.

FIG. 3 illustrates an example user equipment 300 configured to provide data visualizations and collect information for providing network services. In some embodiments, the user equipment 300 can correspond to the electronic devices 104 of FIG. 1, and may be used to implement the various operations described herein. In some instances, electronic devices may include, and is not limited to, one or more servers, smart phones, mobile phones, cell phones, tablet computers, portable computers, laptop computers, personal digital assistants (PDAs), electronic book devices, or any other electronic devices that can generate, request, receive, transmit, or exchange voice, video, and/or digital data. For example, the user equipment 300 may include memory 302 storing the alerts module 120, the visualization module 122, the reporting module 124, and a conversion module 304, as described herein. Also, the electronic device 300 includes processor(s) 306, a removable storage 308 and non-removable storage 310, input device(s) 312, output device(s) 314, and transceiver(s) 316.

In various embodiments, memory 302 is volatile (such as RAM), nonvolatile (such as ROM, flash memory, etc.) or some combination of the two. The alerts module 120, the visualization module 122, the reporting module 124, and the conversion module 304 stored in the memory 302 can comprise methods, threads, processes, applications or any other sort of executable instructions. The alerts module 120, the visualization module 122, the reporting module 124, and the conversion module 304 can also include files and databases.

Details of the alerts module 120, the visualization module 122, and the reporting module 124 are provided above in the discussion of FIG. 1. In general, the alerts module 120 can receive alerts from the centralized server 200 and present the alerts in a conspicuous manner, such as in association with a login display or during authentication. In some instances, the alerts module 120 can receive any type of static content, dynamic content, and/or interactive content and can determine one or more differences between the updated content and earlier content. Next, the visualization module 122 can, in general, present any of the static content, dynamic content, and/or interactive content in accordance with embodiments of the disclosure. Further, the visualization module 122 can receive user input and navigate among content according to logical flows embedded in the content. The reporting module 124 can provide user information files to the centralized server 200 and/or personalized content to the user electronic devices 106, for example.

In some embodiments, the reporting module 124 can further include functionality to provide reports and/or key performance metrics of network connectivity to generate visualizations, as discussed herein. For example, after each call is placed (or as data is transmitted and/or received), the electronic device 300 can provide, to the centralized server 200, for example, Quality of Service (QoS) metrics indicating call quality, signal strength, dropped packets, etc. associated with a communication. In some instances, location data can be provided along with call information, which can be aggregated and utilized in making one or more visualizations of network coverage, as discussed herein. In some instances, aspects of the reporting module 124 can be implemented in some or all of the electronic devices of the telecommunications network to determine network functionality throughout the entire network.

In some embodiments, the conversion module 304 can include functionality to facilitate a transaction for one or more of services or devices, as discussed herein. For example, the associate 110 may interact with the user 112 using the electronic device 104 to educate and inform the user 112 regarding devices and services available on the telecommunications network. In some instances, the user 112 may provide information to the electronic device 104, such as name, date of birth, Social Security Number, address, driver's license number, etc., to determine a credit status of the user 112. Based on the user information (e.g., financial information such as a credit report), the conversion module 304 can present personalized content to the user 112, including but not limited to a cost associated with a device (e.g., down payment and/or monthly fees) or associated with a service (e.g., telephone numbers, data plans, etc.). In some instances, the conversion module 304 may further include functionality to operate as a point-of-sale terminal to conduct and complete a transaction for devices and/or services, as discussed herein. In some instances, a portion of the transaction may be initiated, performed, or completed using the electronic device 104 and/or other electronic devices.

In some embodiments, the one or more processor(s) 306 are central processing units (CPUs), graphics processing units (GPUs), or both CPU and GPU, or other processing units or components known in the art.

The user equipment 300 also includes additional data storage devices (removable and/or non-removable) such as, for example, magnetic disks, optical disks, or tape. Such additional storage is illustrated in FIG. 3 by removable storage 308 and non-removable storage 310. Tangible computer-readable media can include volatile and nonvolatile, removable and non-removable media implemented in any method or technology for storage of information, such as computer readable instructions, data structures, program modules, or other data. Memory 302, removable storage 308 and non-removable storage 310 are all examples of computer-readable storage media, as described above in connection with FIG. 2.

The user equipment 300 also can include input device(s) 312, such as a keypad, a cursor control, a touch-sensitive display, voice input device, etc., and output device(s) 314 such as a display, speakers, haptic feedback, printers, etc. These devices are well known in the art and need not be discussed at length here.

As illustrated in FIG. 3, the electronic device 300 also includes one or more wired or wireless transceiver(s) 316, similar to the transceiver(s) 220 described above in connection with FIG. 2.

Figure 4:
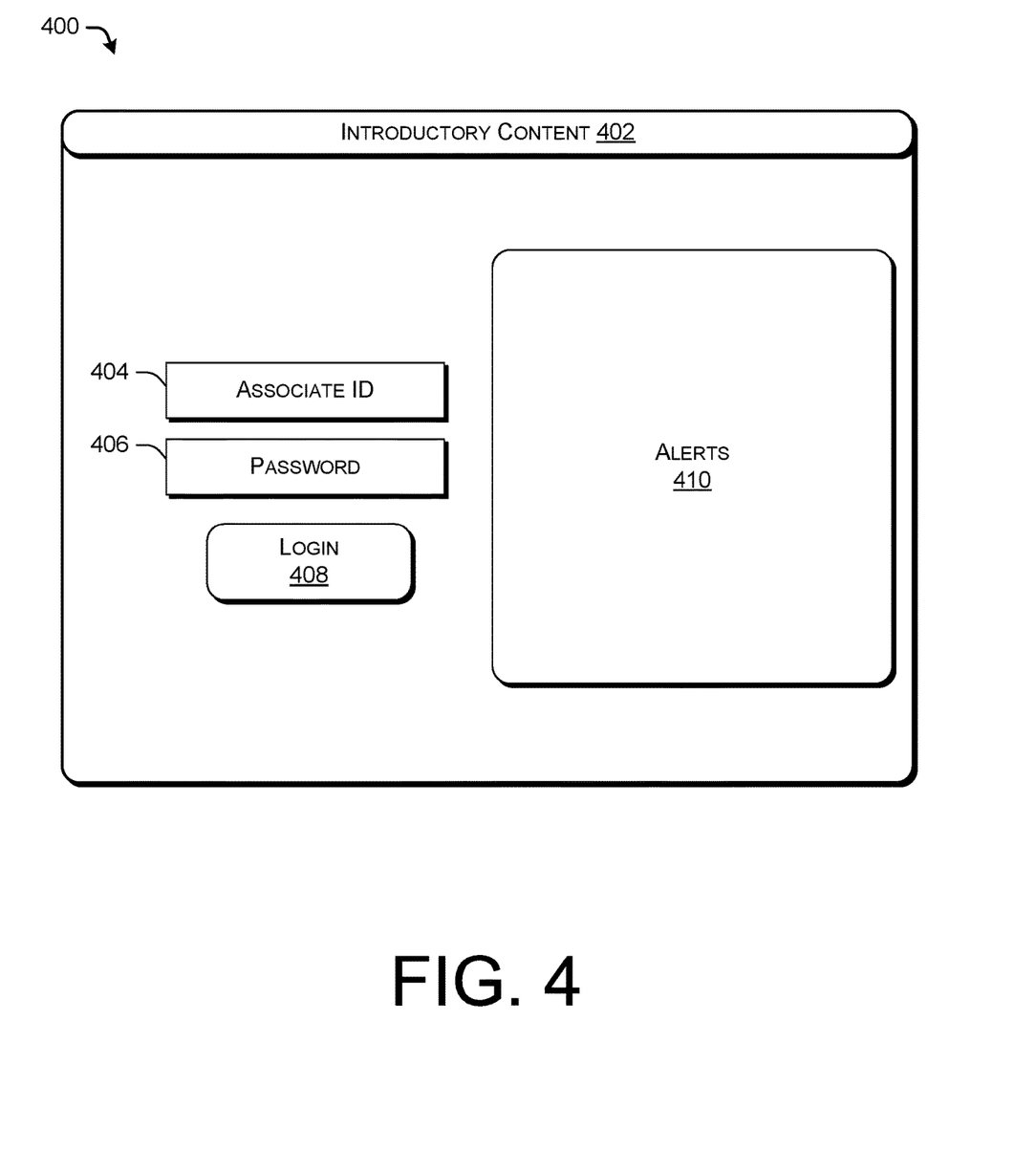
FIG. 4 illustrates an example visualization for providing alerts and receiving information.

FIG. 4 illustrates an example visualization 400 for providing alerts and receiving information. For instances, the example visualization 400 may represent introductory content 402, such as a login screen to be presented on a display of the electronic device 104. In some instances, the login screen may include fields 404 and 406 to enter an "Associate ID" and a "Password", as well as a login button 408, which may initiate the authentication process. Further, the introductory content 402 may include one or more alerts 410, which may include any number of static content, dynamic content, and/or interactive content conveying information about changes to offers, deals, promotions, etc. Further, the alerts 410 may include any messages or news that has been pushed by the centralized server 200 to one or more of the electronic devices 104. In some instances, the alerts 410 may include information relating to a work schedule of an associate (e.g., the associate 110), such as starting time, ending time, etc., as well as alerts relevant to a store or retail location.

Figure 5:
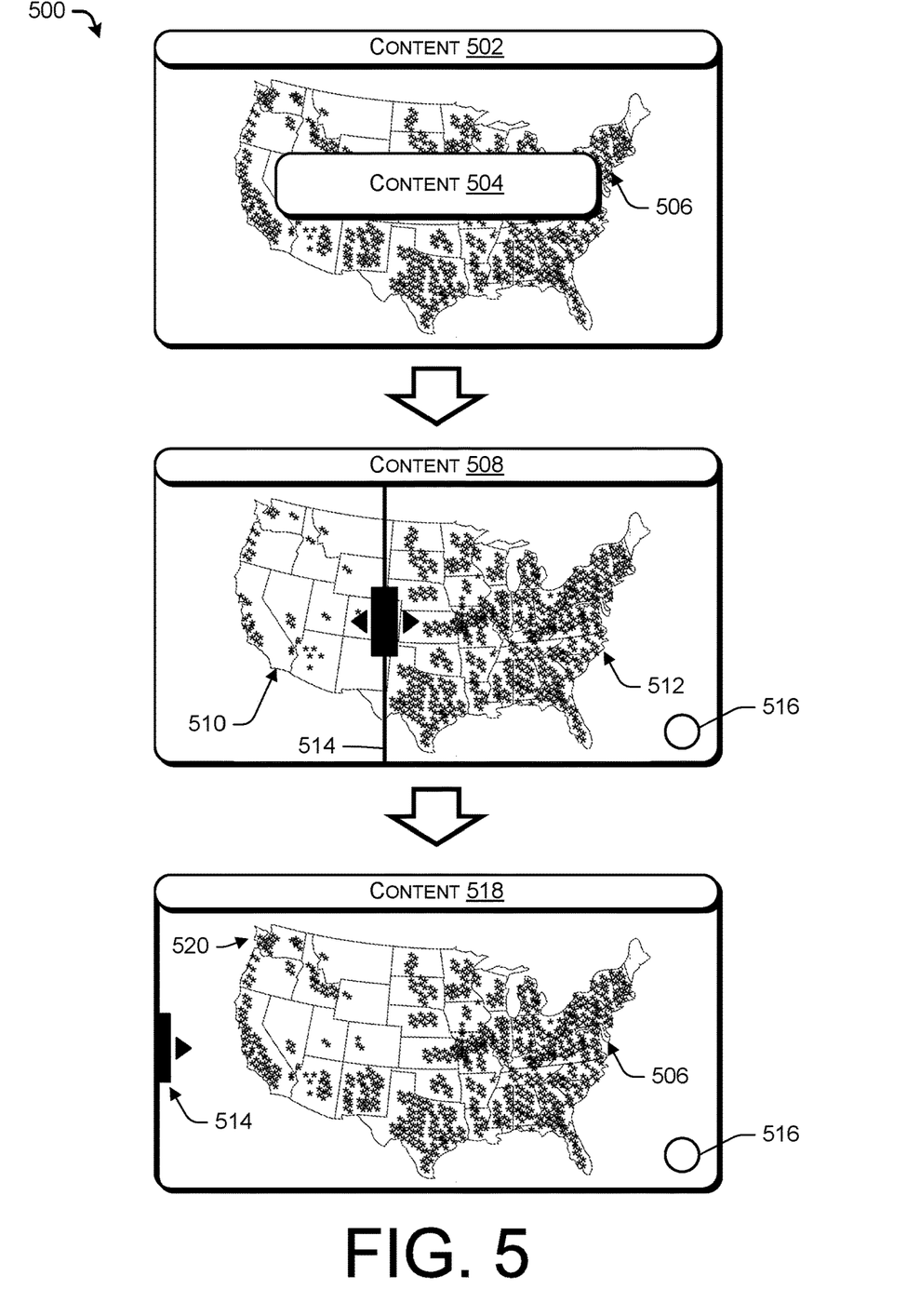
FIG. 5 illustrates an example of visualizations of network coverage over time.

FIG. 5 illustrates an example 500 of visualizations of network coverage over time. At a first time, content 502 is presented on a display of the electronic device 104, for example. The content 502 may include static content 504, which may include introductory comments or instructions how to interact with the content 502. In one example, the content 502 illustrates a map with indications 506 illustrating network coverage at a location. In some instances, when an interaction is received (e.g., as a touch, tap, swipe, voice command, etc.), the content 502 can transition to content 508 at a second time.

The content 508 represent interactive content of first network coverage at a first time (e.g., in the left portion 510 of the content 508) and second network coverage at a second time (e.g., in the right portion 512 of the content 508). In some instances, a user can manipulate the interactive divider 514 (also referred to as an interactive slider) left and right, for example, to expose various portions of the left portion 510 and the right portion 512. By way of example, and without limitation, the left portion 510 may represent a network coverage of wireless signals at a first year, while the right portion 512 may represent a network coverage of wireless signals at a second year after the first year. Thus, an associate or a user may draft or otherwise manipulate the interactive divider 514 to compare and contrast relative levels of network cover over time. Further, a button 516 may allow a user or associate to select various aspects of network coverage to compare, such as various years, types of coverage, anticipated coverage, competitor coverage, etc.

Further, content 518 may illustrate interactive content at a third time, after the second time, when the interactive divider 514 is in a position corresponding to the left of the content 518. In this example, the content 506 may be present on the display, with additional coverage shown as coverage 520. It may be understood that in the configuration shown as the content 518, the content 518 may be manipulated to zoom in on a particular location, or to input an address associated with a location, for example, as discussed in connection with FIG. 6.

Figure 6:
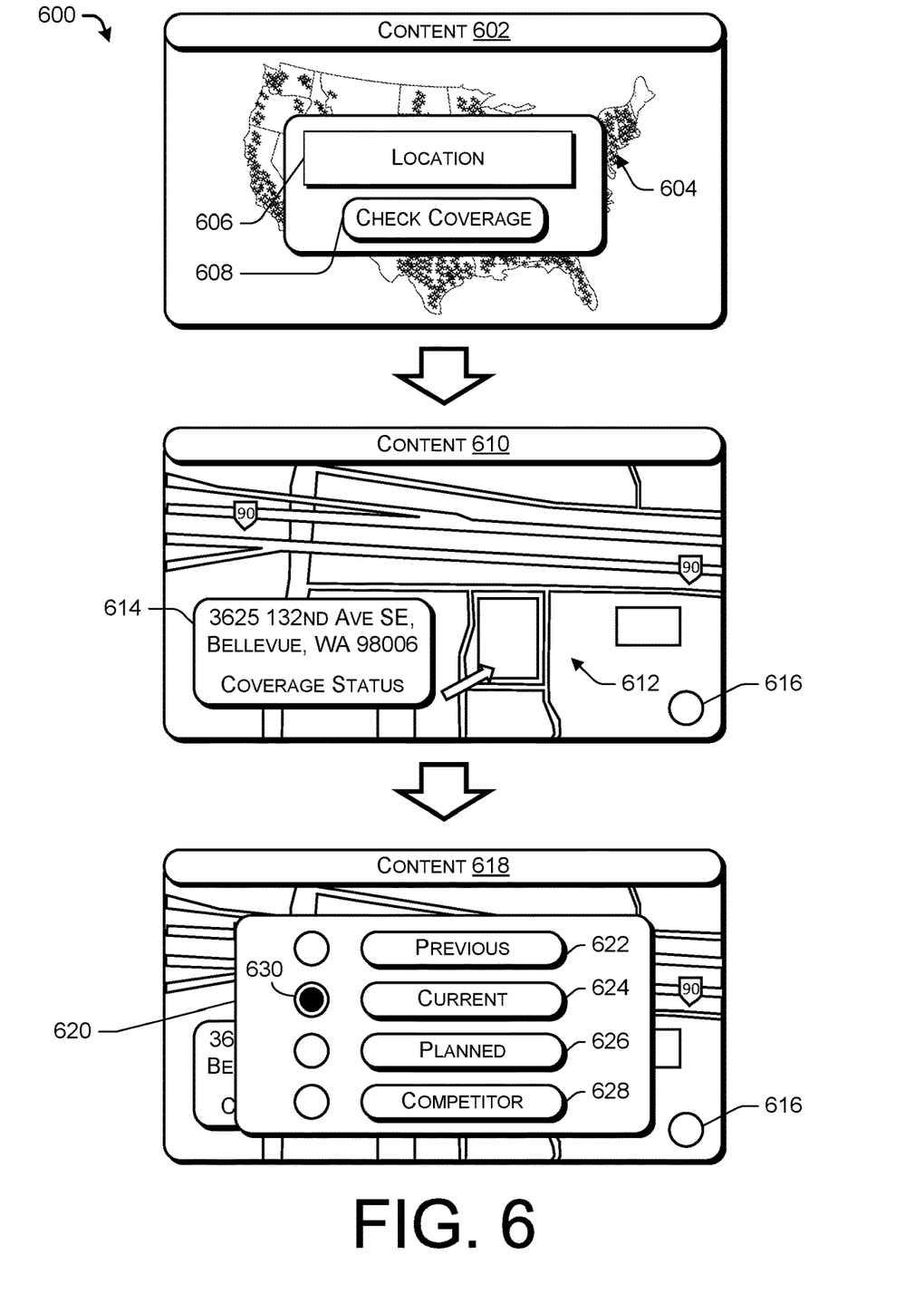
FIG. 6 illustrates an example of visualizations of network coverage at a location.

FIG. 6 illustrates an example 600 of visualizations of network coverage at a location. At a first time, content 602 may be presented of a location 604, as well as a location field 606 and an input button 608. For example, an associate and/or a user may input an address or location in the location field 606 to present coverage information associated with that location.

At a second time after the first time, and in response to inputting an address into the location field 606 (and in response to selecting the input button 608, for example), content 610 may be presented for display. In some instances, the content 610 illustrates a detail view 612 of the location 604 identified by the location field 606, which in the content 610, corresponds to a location at 3625 132$^{nd}$ Ave SE, Bellevue, Wash. 98006. Further coverage details may be provided as content 614, which may be overlaid or placed over the detail view 612 of the location. In some instances, the content 614 may include measures of call quality or signal strength at the location, and in some instances, the measure of call quality of call quality or signal strength may correspond to actual data collected by electronic devices, for example. In some instances, the content 610 may include a button 616 for causing presentation of another screen for selecting additional features for data visualization.

For example, in response to selecting the button 616, content 618 may be presented, which includes content 620 for displaying additional selections. In some instances, additional selections include, but are not limited to previous 622, current 624, planned 626, and competitor 628. As illustrated, a radio button 630 indicates that the current information displayed corresponds to the current 624 network coverage. It may be understood that selecting the previous 622 input may display historical network coverage, while selecting the planned 626 input may display future or anticipated network coverage levels. Further, it may be understood that selecting the competitor 628 input may display network coverage associated with a competitor, for example.

In some instances, the content 618 may allow for simultaneous selection of one or more inputs 622, 624, 626, and 628 for digital visualizations of complex data systems, such as network coverage, over time and associated with a particular location. As may be understood, the disclosure is not limited to the specific examples discussed herein, and may cover visualizations of any data type, and for any industry or specialty.

Figure 7:
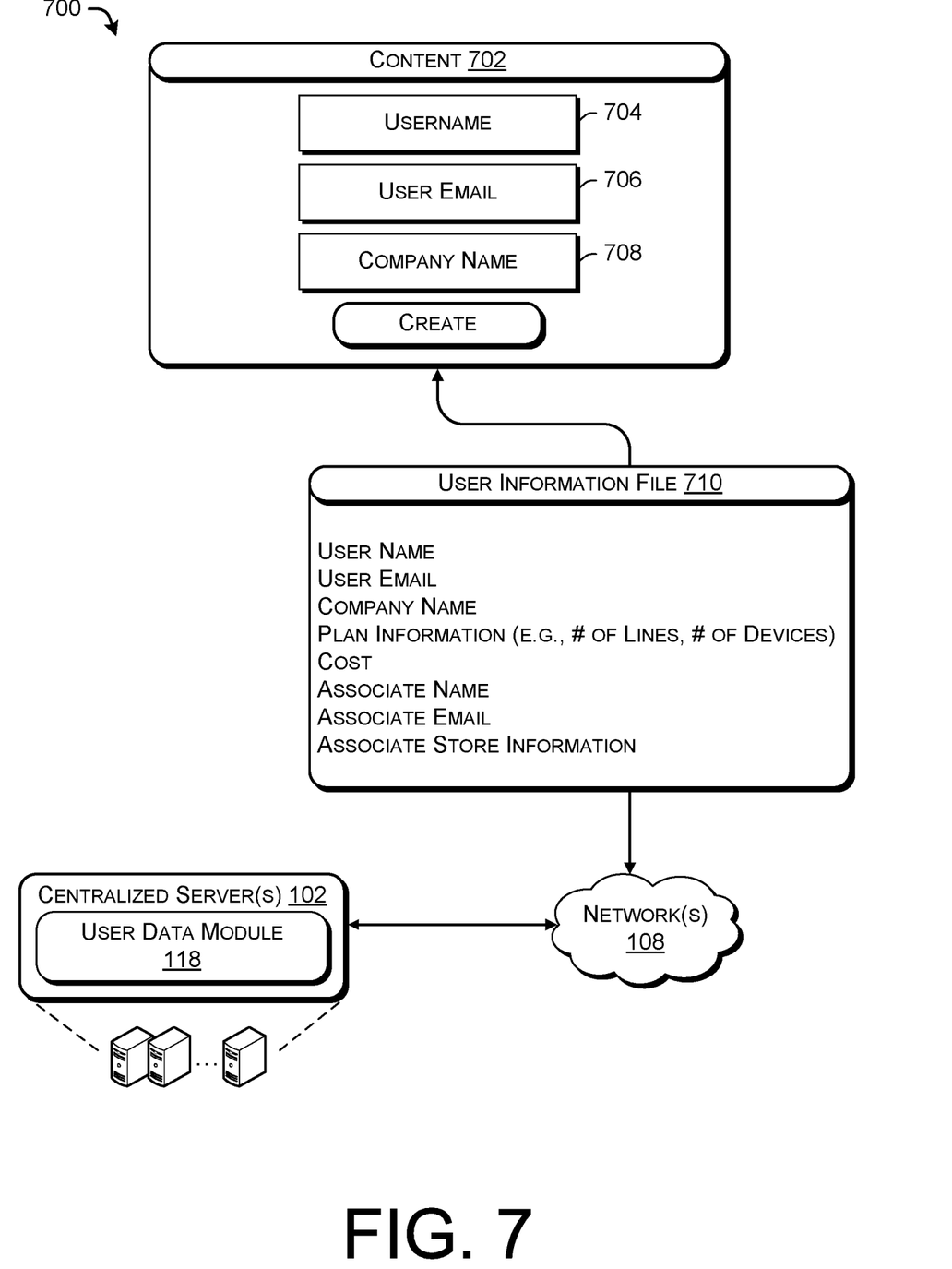
FIG. 7 illustrates an example environment for collecting user information and providing information to a centralized server.

FIG. 7 illustrates an example environment 700 for collecting user information and providing information to a centralized server. For example, content 702 may be invoked to display one or more user interfaces for inputting information. In one embodiment, the content 702 may present one or more input fields such as a username input field 704, a user email input field 706, a company name input field 708, etc., to receive information associated with a user. Of course, any number and type of input fields may be included with the content 702 to receive a variety of user information elements.

As user information is received via the content 702 display, the electronic device (e.g., the electronic device 106) may generate a user information file 710 that includes information associated with the user and/or associated with the associate. For example, the user information file 710 may include, but is not limited to, information such as: user name; user email; company name; plan information (e.g., a number of lines associated with a service plan, a number/type of devices associated with the service plan); cost (e.g., of the service plan and/or any devices, insurance, etc.); associate name (e.g., who collaborated with the user); associate email; associate store information; etc. In some instances, the user information file 710 may be transmitted via the network 108 to the centralized server 102, to be stored in the user data module 118, for example, as discussed herein.

Figure 8:
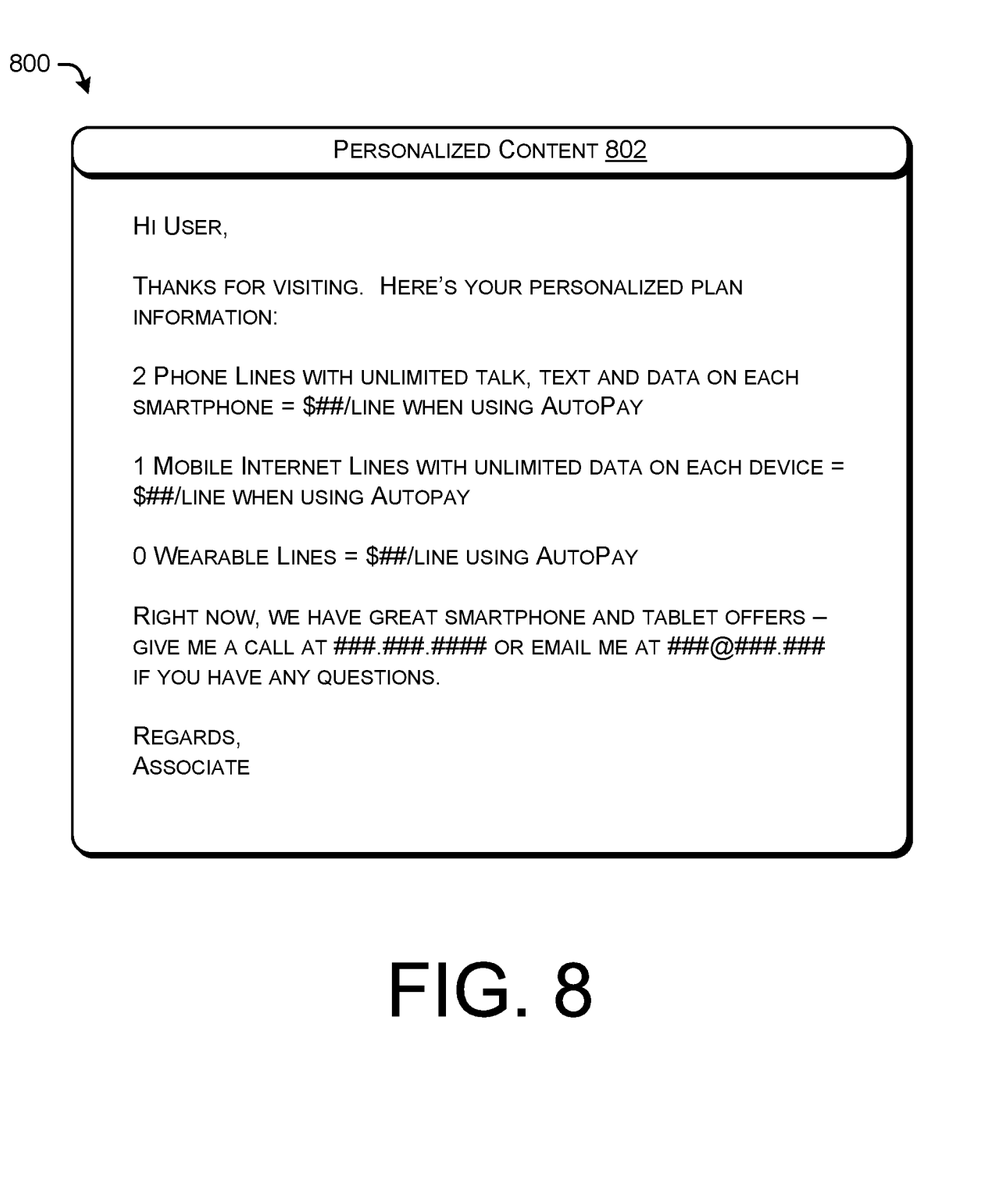
FIG. 8 illustrates an example visualization of personalized content following an interaction between an associate and a user, for example.

FIG. 8 illustrates an example visualization 800 of personalized content 802 following an interaction between an associate and a user, for example. In some instances, the personalized content 802 may be prepared by the centralized server 102 at least partially in response to receiving the user information file 710, for example, of FIG. 7. In some instances, the personalized content 802 can include a summary of services and/or devices discussed with the associate and user and facilitated using the electronic device 104, as discussed herein. In some instances, the personalized content 802 may include services and devices discussed with the associated and user, as well as a costs representing actual costs, based on user information, such as user financial information. As may be understood, the personalized content can take any form, such as a text message (e.g., SMS, MIMS, etc.), an email, an indication in a specialized application a telephone call, a physical letter or postcard, etc., and is not limited to the content illustrated in FIG. 8.

In one embodiment, when the personalized content 802 is embodied as an email transmitted from the electronic device 104 to the user electronic device 106, the personalized content may be delivered from a generic email address (e.g., support@domain.com). However, if the user associated with the user electronic device replies to the personalized content 802 (e.g., as a reply email), the reply email may be directed to the associate who interacted with the user at the store or retail location. If an email is sent to the generic address not as a reply to personalized content, for example, a reply email may be provided indicating that the email address is unmonitored, without forwarding the email to a particular associate email address.

Figure 9:
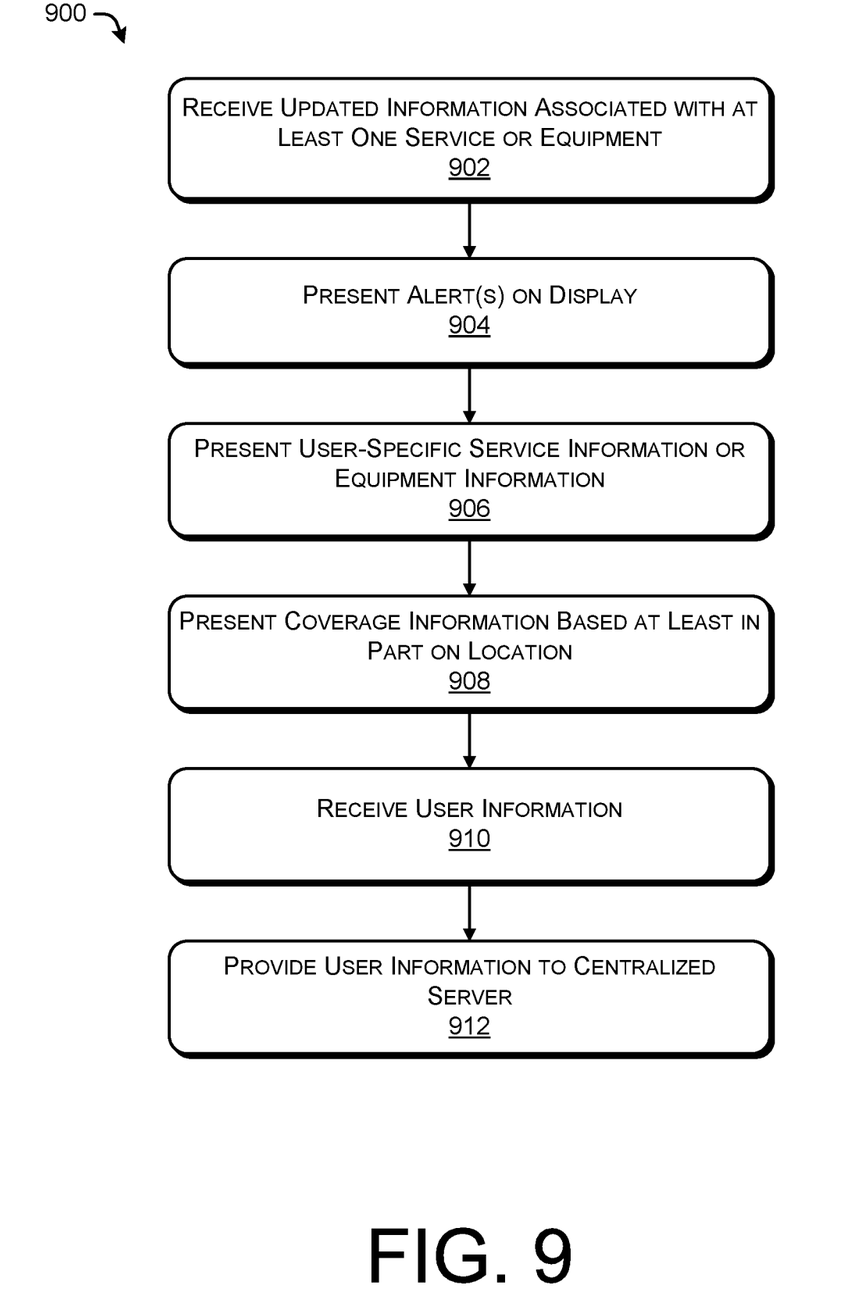
FIG. 9 illustrates an example process for providing digital visualizations in accordance with embodiments of the disclosure.

FIG. 9 illustrates an example process in accordance with embodiments of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 9 illustrates an example process 900 for providing digital visualizations in accordance with embodiments of the disclosure. The example process 900 can be performed by an electronic device (e.g., the electronic device 104 or 300), for example. Further, some or all of the process 900 can be performed by one or more components in the environment 100.

At 902, the operation can include receiving updated information associated with at least one service or equipment. In some instances, the operation 902 may include providing initial information associated with services or equipment, such as an application for providing the digital visualizations discussed herein. As noted above, the operation 902 may further provide updates to the information, which may include new offers, specials, promotions, messages, etc., associated with services or devices. For example, and without limitation, an example of an alert may be an updated price of a single mobile telephone line from a first price to a second price that is lower than the first price. In some instances, the updates in the operation 902 may be provided to various devices based on geographical proximity, such as based on a city or state associated with the electronic devices (e.g., the electronic devices 104). In some instances, updated information may be associated with updated artwork or messaging, and may include any updates to static content, dynamic content, interactive content, or any combination thereof.

At 904, the operation can include presenting alerts on a display, such as a display associated with the electronic device 104. In some instances, the alerts may correspond to differences between previous content and the updated content received in the operation 902. In some instances, the updated content may include alerts or content that has been indicated as an alert to be presented as an alert. As discussed above with respect to FIG. 4, the alerts may be presented in a conspicuous manner, such as on a dedicated screen or content, to highlight messages or changes that may be particularly relevant to an associate. In some instances, the alerts may be audio alerts, haptic alerts, visual alerts, and may be presented using respective presentation media.

At 906, the operation can include presenting user-specific service information or equipment information. In some instances, the operation 906 may include receiving user information via one or more user interfaces, and generating user-specific service information or equipment information, as discussed herein. For instances, user-specific service information or equipment information may include offers or promotions based on a user history (e.g., customer history, customer loyalty), user financial information (e.g., credit report, prepay, autopay, etc.), current devices, anticipated devices, inventory, network capacity, upgrade cycle, location, age, number of phone lines or device subscriptions, other offers, etc. Further, user-specific service information or equipment information may be based on a user type, such as an individual customer, business customer, government customer, etc.

At 908, the operation can include presenting coverage information based at least in part on a location. For example, the operation 908 can include receiving a location via a user interface, and may provide a map corresponding to that location. Further, the operation 908 can include accessing one or more databases that include coverage information associated with the input location. For example, the coverage information may include actual usage information from mobile devices proximate to the location indicating signal strength, bandwidth, signal to noise ratio, congestion metrics, etc. Further, coverage information may include historical coverage information, for example, in the past prior to a network upgrade. In some instances, the coverage information may include proposed or future network coverage (e.g., anticipated following a network upgrade). In some instances, the coverage information may include competitor coverage information, information associated with various network generations (e.g., 3G, 4G, 4G LTE, 5G, etc.). In some instances, the coverage information may be provided for various operations, such as uplink and/or downlink speed, etc. As may be understood, the operation 908 may include any number of interactive content, receiving user input, updating content, etc. to present digital visualizations, as discussed herein.

At 910, the operation can include receiving user information. As discussed above, various operations of the process may include receiving user information (e.g., to present the user-specific service information or equipment information, to present coverage information based on location, etc.). However, the operation 910 may include receiving additional information, or may correspond to the operations discussed above of receiving user information via one or more user interfaces. As discussed herein, the user interfaces provided on the electronic devices 104 allow users and/or associates to input user information to provide personalized content, more accurate estimates, and/or indications of actual offers based on user information.

At 912, the operation can include providing the user information to a centralized server. As discussed above, the electronic device 104 may generate a user information file and transmit the user information file to the centralized server for ingestion into one or more user information databases. In some instances, the operation 912 may include transmitting some or all of the user information to a user electronic device 106 associated with a user, for example.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
a memory storing computer-executable instructions that, when executed by the one or more processors, cause the one or more processors to perform operations comprising:
receiving information associated with at least one service and at least one device, the at least one service and the at least one device configured to operate on a telecommunications network;
presenting at least one alert on a display of an electronic device, the at least one alert based at least in part on an update to the information, wherein the presenting the at least one alert presents the at least one alert to an associate at a retail location based at least in part on the information associated with the at least one service and the at least one device, the at least one alert presented on the display of the electronic device in association with authenticating an identity of the associate;
presenting interactive content on the display of the electronic device, the interactive content including at least a coverage map, the coverage map indicating network coverage at various locations on the coverage map;
receiving, via a first user interface presented on the display, an indication of a location associated with a user;
generating, based at least on the indication of the location associated with the user, a localized coverage map and a localized network coverage associated with the location, the localized network coverage including a first localized network coverage associated with a first time and a second localized network coverage associated with a second time;
presenting the localized coverage map and the localized network coverage on the display based at least in part on the location associated with the user, the localized coverage map representing a subset of the coverage map associated with the location;
receiving, via a second user interface presented on the display, user information associated with the user; and
generating a user information file including at least i) an indication of a service of the at least one service or an indication of a device of the at least one device, ii) an indication of the location associated with the user, and iii) at least a portion of the user information.

2. The system of claim 1, the operations further comprising transmitting personalized content to a user electronic device associated with the user, the personalized content based at least in part on the user information file.

3. The system of claim 1, the operations further comprising presenting the at least one alert on a login screen presented on the display of the electronic device.

4. The system of claim 1, wherein the localized network coverage is based at least in part on verified coverage data associated with the location.

5. A system comprising:
one or more processors; and
a memory storing computer-executable instructions that, when executed by the one or more processors, cause the one or more processors to perform operations comprising:
receiving, from a centralized server, information associated with at least one service and at least one device, the at least one service and the at least one device configured to operate on a telecommunications network;
presenting at least one alert to an associate at a retail location based at least in part on the information associated with the at least one service and the at least one device, the at least one alert presented on a display of an electronic device in association with authenticating an identity of the associate;
presenting on the display of an electronic device, first interactive content based at least in part on the information;
receiving, via a first user interface presented on the display, at least a location associated with a user;
generating, based at least on the location associated with the user, a localized coverage map associated with the location;
presenting, on the display of the electronic device, second interactive content, the second interactive content including at least the localized coverage map indicating network coverage at various locations on the localized coverage map, the network coverage including a first network coverage associated with a first time and a second network coverage associated with a second time, the various locations comprised of at least the location;
receiving, via a second user interface presented on the display, user information associated with the user; and
transmitting a user information file to the centralized server, the user information file including at least an indication of the location associated with the user and at least a portion of the user information.

6. The system of claim 5, the operations further comprising receiving, from the centralized server and by a plurality of electronic devices configured to operate in association with the telecommunications network, the information associated with the at least one service and the at least one device.

7. The system of claim 5, wherein at least one service is a wireless subscription plan for a mobile telephone.

8. The system of claim 5, wherein the localized coverage map is based at least in part on verified coverage aggregated from a plurality of electronic devices providing indications of network conditions.

9. The system of claim 5, the operations further comprising transmitting personalized content to a user electronic device associated with the user, the personalized content based at least in part on the user information file and including at least an indication of a first selection of a service of the at least one service and a second selection of a device of the at least one device.

10. The system of claim 5, wherein the second interactive content includes at least an interactive divider that is configured to receive input to display varying portions of the first network coverage associated with the first time and the second network coverage associated with the second time.

11. The system of claim 5, the operations further comprising:
accessing financial history information associated with the user based at least in part on the user information; and
presenting personalized content to the user, the personalized content based at least in part on the financial history information associated with the user.

12. The system of claim 5, the operations further comprising:
transmitting personalized content to the user, the personalized content based at least in part on the user information and the information associated with the at least one service and the at least one device;
receiving, at least partially in response to the personalized content, a response from a user electronic device; and
routing the response to an electronic mail address associated with the electronic device.

13. A processor-implemented method comprising:
receiving, from a centralized server, information associated with at least one service and at least one device, the at least one service and the at least one device configured to operate on a telecommunications network;
presenting at least one alert on a display of an electronic device, the at least one alert based at least in part on the information, wherein the presenting the at least one alert presents the at least one alert to an associate at a retail location based at least in part on the information associated with the at least one service and the at least one device, the at least one alert presented on the display of the electronic device in association with authenticating an identity of the associate;
presenting, on the display of the electronic device, first interactive content based at least in part on the information;
presenting, on the display of the electronic device, second interactive content, the second interactive content including at least a coverage map indicating network coverage at various locations on the coverage map;
receiving, via a first user interface presented on the display, a location associated with a user;
receiving, via a second user interface presented on the display, user information associated with the user;
presenting, based at least on the location associated with the user, the second interactive content including a localized coverage map associated with the location, the localized coverage map indicating a first localized network coverage associated with the location at a first time and a second localized network coverage associated with the location at a second time; and
transmitting a user information file to the centralized server, the user information file including at least an indication of the location associated with the user and at least a portion of the user information.

14. The processor-implemented method of claim 13, further comprising receiving, from the centralized server and by a plurality of electronic devices configured to operate in association with the telecommunications network, the information associated with the at least one service and the at least one device.

15. The processor-implemented method of claim 13, wherein the coverage map is based at least in part on verified coverage aggregated from a plurality of electronic devices providing indications of network conditions.

16. The processor-implemented method of claim 13, further comprising transmitting personalized content to a user electronic device associated with the user, the personalized content based at least in part on the user information file and including at least an indication of a first selection of a service of the at least one service and a second selection of a device of the at least one device.

17. The processor-implemented method of claim 13, wherein the second interactive content includes at least an interactive divider that is configured to receive input to display varying portions of the first localized network coverage and the second localized network coverage.

18. The processor-implemented method of claim 13, further comprising:
transmitting personalized content to the user, the personalized content based at least in part on the user information and the information associated with the at least one service and the at least one device;
receiving, at least partially in response to the personalized content, a response from a user electronic device; and
routing the response to an electronic mail address associated with the electronic device.

* * * * *